United States Patent [19]

David

[11] 3,902,456
[45] Sept. 2, 1975

[54] PET PILLOW AND METHOD OF MAKING THE SAME

[76] Inventor: Mildred M. David, 23401 Park Sorrento, No. 10, Calabasas, Calif. 91302

[22] Filed: Jan. 25, 1974

[21] Appl. No.: 436,497

[52] U.S. Cl. .................................. 119/1; D6/201
[51] Int. Cl. ............................................. A01k 1/00
[58] Field of Search ............ 119/1; 5/357, 359, 341, 5/337, 338, 339; D6/201, 202, 203, 204

[56] References Cited
UNITED STATES PATENTS

| D230,454 | 2/1974 | Thompson | D6/201 |
|---|---|---|---|
| 2,032,248 | 2/1936 | Bins | 119/1 |
| 2,552,476 | 5/1951 | Barton | D6 X/201 |

Primary Examiner—Louis G. Mancene
Assistant Examiner—Peter K. Skiff
Attorney, Agent, or Firm—Fulwider, Patton, Rieber, Lee & Utecht

[57] ABSTRACT

A bed for dogs, cats and the like having a hollow doughnut-shaped sidewall of flexible fabric filled with resiliently compressible stuffing, and a disc-shaped bottom pad closing one side of the recess defined by the sidewall. The shell of the pillow comprises substantially identical, top and bottom disc-shaped panels, and a rectangular side panel that is stitched to the peripheral portions of the top and bottom panels and joins them together, with constricting means incorporated in the joint between the top and side panels. The method of making the pillow includes the steps of cutting the three panels, joining the peripheral portions of the top and bottom panels to the side panel, joining the central portions of the top and bottom panels together for the bottom pad, stuffing the latter and the sidewall, and closing up the access openings left for the stuffing steps.

11 Claims, 4 Drawing Figures

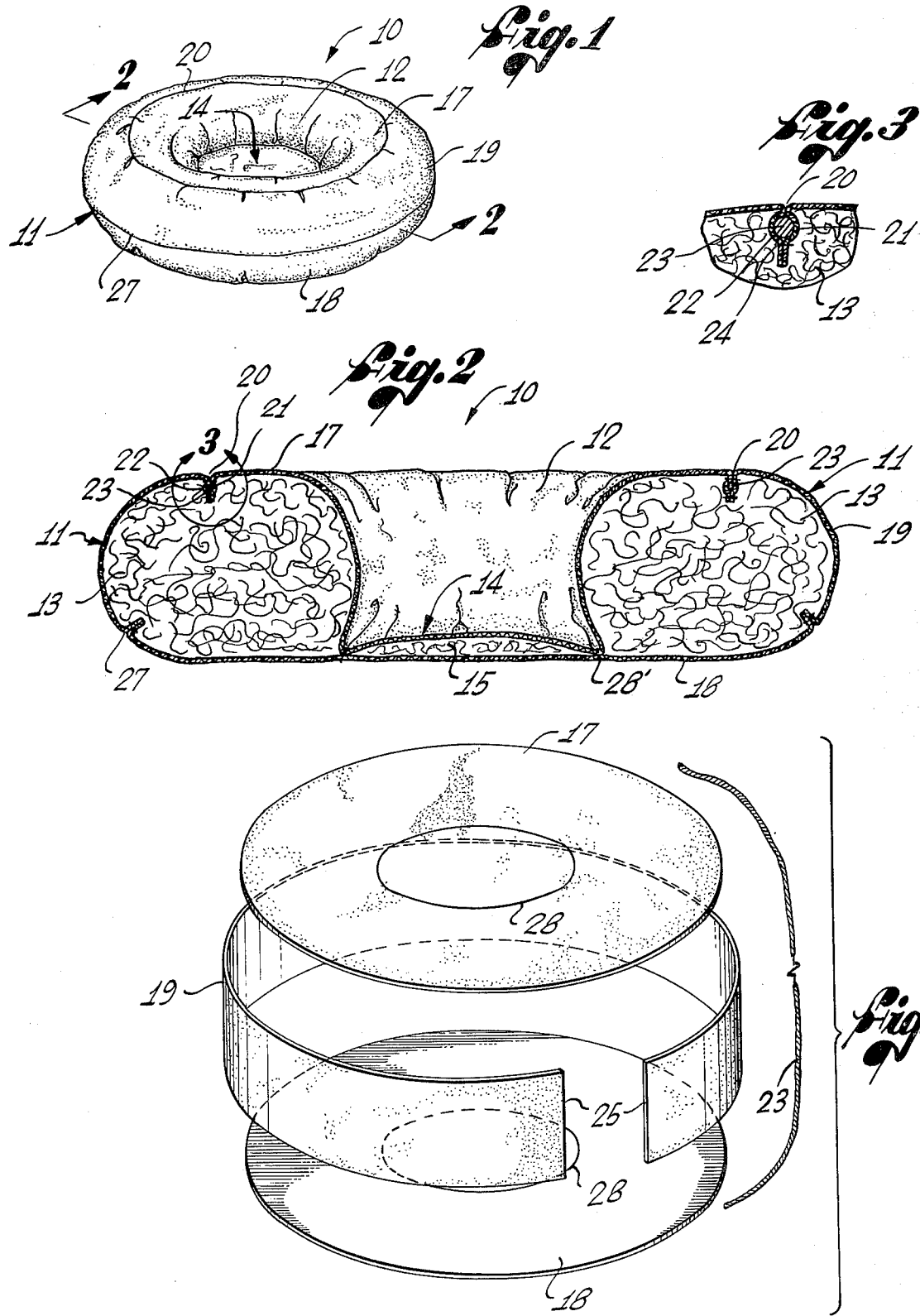

PET PILLOW AND METHOD OF MAKING THE SAME

BACKGROUND OF THE INVENTION

This invention relates to an upholstery article, and relates more particularly to a bed or pillow specially designed for use by domestic pets, such as dogs, cats and the like.

This general type of article has been known and patented in the past, as shown by U.S. Pat. Nos. 2,032,248 and Design 216,400, each of which discloses a pet bed that is substantially circular in outside shape, having an annular sidewall and a circular wall forming the bottom of the bed. U.S. Pat. No. 2,032,248 discloses a relatively complex bed comprising an annular bolster that is placed on top of a separate padded base of substantially the same outside diameter as the bolster, with other accessories completing the bed. U.S. Pat. No. Design 216,400 discloses a cup-shaped bed that apparently is covered with fur-like material and has an upright, substantially cylindrical sidewall of undisclosed composition.

While each of these patented pet beds undoubtedly will serve the purpose for which they were designed, neither is regarded as accomplishing the purpose in an optimum manner, in terms of comfort, ease of accessibility, attractiveness as a piece of furniture, and economy of manufacture. The general objective of the present invention is to provide a novel pet bed or pillow that is a substantial improvement in these areas.

SUMMARY OF THE INVENTION

The present invention resides in a pet pillow of the foregoing general character which may be fabricated quickly and easily of fabric and stuffing material, to be saleable at a reasonable and competitive price, and which, at the same time, is very comfortable, warm and easily accessible to the pet, and sufficiently attractive in appearance to be used in the home, as well as in automobiles. The invention also resides in the novel method of making such a pet pillow.

More specifically, and as illustrated in the preferred embodiment of the invention shown herein, the pet pillow comprises a hollow, doughnut-shaped sidewall of flexible fabric material filled with soft and resiliently compressible stuffing, and a hollow, disc-shaped bottom pad, also composed of flexible fabric and filled with stuffing, the bottom pad being fitted in the annular sidewall substantially flush with the underside thereof. This pillow is made with only three pieces of fabric—two disc-shaped panels of substantially the same size and shape forming the top and the bottom, and a rectangular side panel (or "boxing") that is joined to both disc-shaped panels around the peripheral edges thereof, and having its ends joined together on one side of the pillow. The central portion of the top panel is sunken in the center, and a disc-shaped portion thereof is joined to the bottom panel to form the bottom pad.

The disc-shaped panels may be either circular or oval in shape, depending upon the desired overall shape of the pillow. To enhance its appearance and facilitate its fabrication, means are provided for constricting the joint between the top and side panels, preferably after insertion of the stuffing. The preferred constricting means is a drawstring slidably installed in this joint.

Other aspects and advantages of the invention will become apparent from the following detailed description, taken in conjunction with the accompanying drawings.

BRIEF DESCRIPTION OF THE DRAWINGS

FIG. 1 is a perspective view of a pet pillow embodying the novel features of the present invention and made with the method of the invention;

FIG. 2 is an enlarged cross-sectional view taken along line 2—2 of FIG. 1;

FIG. 3 is a further enlarged fragmentary view of the portion of FIG. 2 within the arc 3 thereof; and FIG. 4 is an exploded perspective view schematically illustrating the basic components of the pillow, except the stuffing, prior to assembly of the parts.

DETAILED DESCRIPTION

As shown in the drawings for purposes of illustration, the invention is embodied in a pet pillow, indicated generally by the reference number 10, for use as a bed for a cat, a dog, or other domestic pet. In general, the improved pillow 10 comprises a hollow annular sidewall 11 of generally circular cross-section (best seen in FIG. 2), a central nesting recess 12 defined within the sidewall, an annular mass 13 of stuffing material filling the chamber defined by the sidewall, and a disc-shaped bottom pad 14 closing the lower side of the recess, this pad being filled with a disc-shaped mass 15 of the stuffing material.

The details of the structure of the pillow 10 are shown most clearly in FIG. 2, wherein it will be seen that three pieces of fabric make up the shell of the pillow. These are shown separately in FIG. 4, and are a disc-shaped top panel 17, a similar bottom panel 18, and an elongated rectangular side panel 19, the length of the side panel 19 being about the same as the circumference of each disc-shaped panel.

In making the pillow, the two disc-shaped panels 17 and 18 are cut to the desired shape, either circular or oval, and are made about the same size as the size desired for the end product. The side panel is cut with a length equal to or slightly greater than the circumference of the disc-shaped panels, preferably from the same material. For example, the discs, if circular, may be made with a diameter of about 30 inches, and the side panel with a length equal to the computed circumference. A suitable width for this side panel would be about 7 inches.

When the panels have been prepared, the side panel 19 is sewn to the upper edge portion of the top panel 17, along a joint 20 that preferably is about one and one-half inches from the edge of each panel. This provides marginal portions 21 and 22 (see FIG. 3) beyond the stitching, between which a drawstring 23, or other constricting means, may be slidably mounted.

In this case, an elongated cord is disposed between these marginal portions 21 and 22, which are then stitched at 24 beyond the cord to encase the cord between the panels, inside the joint 20. The ends of the drawstring thus formed are tied off where the ends 25 of the side panel 19 come together, to leave an accessible loop (not shown).

Next, the bottom panel 18 is sewn to the lower edge portion of the side panel 19, to form a joint 27. An access opening (not shown) should be left at the ends 25 of the side panel, for use in the eventual stuffing of the pillow.

Now, the central portion of the top panel 17 is placed against the corresponding portion of the bottom panel 18, preferably using markings 28 (FIG. 4) applied before the stitching operations, concentric with the peripheries of the two panels 17 and 18 and of the size desired for the bottom pad 14. The panels are stitched together along the markings 28, to form a joint 28', as shown in FIG. 2. This joint initially is left incomplete on one side, in line with the side panel edges 25, to provide a small access opening for use in stuffing the bottom pad 14.

At this stage, the pillow is ready for stuffing with a suitable material such as washable polyester fiber filling, which first is inserted in the bottom pad until it is substantially filled and softly padded. Then the stitching of the joint 28' is completed, and the annular sidewall 11 is stuffed until it also is substantially filled and softly padded.

Before the sidewall 11 is closed up, the crawstring 23 is pulled to constrict the joint 20, and is tied off inside the sidewall. The amount of constriction may be about 12 inches of the drawstring, which draws the upper portion of the side panel 19 over the stuffing 13 while gathering the material along the joint 20 for an attractive, random-pleating effect, illustrated generally in FIG. 1. Then the access opening is closed, typically by hand-sewing, and the pillow is complete.

Various fabric materials may be used, the preferred type of material being washable and decorative fabrics such as fur-like synthetics that are readily available in a variety of colors at reasonable prices. These materials are soft, comfortable and warm, and enhance the advantages achieved with the construction of the pillow shown and described herein.

From the foregoing, it will be apparent that the pet pillow 10 of the present invention is of a novel and attractive construction which not only contributes to the comfortableness and accessibility of the pillow to pets, but also makes practical the economical fabrication of such pillows in substantial members by sewing personnel who can be trained quickly and easily in the procedures to be followed.

It also will be apparent that while a presently preferred specific embodiment has been illustrated and described, various modifications and changes may be made without departing from the spirit and scope of the invention.

I claim:

1. A pet pillow comprising:
   a disc-shaped bottom panel of flexible material;
   an elongated side panel of flexible material having a lower edge extending around the peripheral edge portion of said bottom panel and joined thereto, said side panel also having an upper edge substantially parallel to said lower edge;
   a disc-shaped top panel of flexible material similar in size and shape to said bottom panel, said top panel having a peripheral edge portion joined to said upper edge of said side panel;
   an annular mass of resiliently compressible stuffing material of generally circular cross-section disposed between said top and bottom panels and extending around the inner side of said panel, said top panel having a recessed portion that extends downwardly within said annular mass of stuffing material to said bottom panel, and having a disc-shaped central portion that is peripherally joined to the central portion of said bottom panel, and cooperating with the latter to define a hollow, disc-shaped chamber; and
   a relatively thick disc-shaped mass of resiliently compressible stuffing material disposed in said chamber between said bottom panel and the central portion of said top panel.

2. A pet pillow as defined in claim 1 in which said top and bottom panels are substantially circular.

3. A pet pillow as defined in claim 2 in which said side panel is rectangular, and has a length substantially equal to the circumference of said circular panels, the ends of said side panel being joined together on one side of said pillow.

4. A pet pillow as defined in claim 1 in which said top and bottom panels are oval in shape.

5. A pet pillow as defined in claim 1 further including constricting means around the peripheral edge portion of said top panel for reducing its circumferential dimension and thereby drawing said upper edge of said side panel over the top of said annular mass of stuffing material while gathering the material of both the side panel and the top panel.

6. A pet pillow as defined in claim 5 in which said constricting means comprises a drawstring slidably encased in said pillow along the joint between said side panel and said top panel.

7. A pet pillow as defined in claim 6 in which said side and top panels are joined together by a first joint adjacent, but spaced, from the edges thereof, and also by a second joint between said first joint and the edges, said drawstring being slidably confined between said joints.

8. A pet pillow as defined in claim 1 in which said panels are sewn together, and said disc-shaped central portion of said top panel is sewn to said bottom panel.

9. A pet pillow as defined in claim 1 in which said panels are composed of a soft, fur-like fabric, and said stuffing is of a fiber type held in said annular and disc-shaped masses by said panels.

10. The method of making a pet pillow, comprising the steps of:
    cutting two disc-shaped panels of fabric of approximately the same size and shape;
    cutting a generally rectangular panel of fabric having a length about equal to the circumference of said disc-shaped panels;
    joining one longitudinal edge of the rectangular panel to one of the disc-shaped panels along the peripheral edge thereof, and bringing the ends of the rectangular panel together;
    joining the other longitudinal edge of the rectangular panel to the other disc-shaped panel along the peripheral edge thereof;
    joining a disc-shaped central portion of one of said disc-shaped panels to the corresponding portion of the other such panel to form a disc-shaped bottom chamber between the central portions of said disc-shaped panels and an annular chamber extending around said bottom chamber along the inner side of said rectangular panel;
    said joining steps initially being performed to leave openings into both of said chambers;
    stuffing said chambers with padding through said openings; and
    completing the joinder of said panels and the ends of said rectangular panel to enclose said chambers.

11. The method defined in claim 10 including the further steps of
installing a drawstring in the joint between said rectangular panel and said one disc-shaped panel prior to joining the disc-shaped central portion of said one panel to the other; and after stuffing said annular chamber, pulling said drawstring to constrict said joint and gather the panels around the stuffing.

* * * * *